US012720268B2

(12) United States Patent
Perlmutter

(10) Patent No.: US 12,720,268 B2
(45) Date of Patent: Aug. 25, 2026

(54) SYSTEMS AND METHODS FOR SOUND-ENHANCED MEETING PLATFORMS

(71) Applicant: The Regents of the University of California, Oakland, CA (US)

(72) Inventor: Saul Perlmutter, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 442 days.

(21) Appl. No.: 18/254,838

(22) PCT Filed: Nov. 30, 2021

(86) PCT No.: PCT/US2021/061264
§ 371 (c)(1),
(2) Date: May 26, 2023

(87) PCT Pub. No.: WO2022/115803
PCT Pub. Date: Jun. 2, 2022

(65) Prior Publication Data

US 2024/0064485 A1 Feb. 22, 2024

Related U.S. Application Data

(60) Provisional application No. 63/119,407, filed on Nov. 30, 2020.

(51) Int. Cl.
*H04S 7/00* (2006.01)
*G06F 3/16* (2006.01)
(Continued)

(52) U.S. Cl.
CPC .............. *H04S 7/302* (2013.01); *G06F 3/165* (2013.01); *G10L 21/028* (2013.01); *H04R 3/12* (2013.01);
(Continued)

(58) Field of Classification Search
CPC ...... H04S 7/302; H04S 3/008; H04S 2400/01; H04S 2400/11; H04R 3/12; H04R 5/02;
(Continued)

(56) References Cited

U.S. PATENT DOCUMENTS

2008/0260131 A1* 10/2008 Akesson ............... H04M 3/568 379/202.01
2010/0316232 A1* 12/2010 Acero .................... H04R 27/00 379/202.01
(Continued)

FOREIGN PATENT DOCUMENTS

KR 20140097555 A 8/2014
KR 20190085883 A 7/2019
(Continued)

OTHER PUBLICATIONS

ISA Korean Intellectual Property Office, International Search Report and Written Opinion Issued in Application No. PCT/US2021/061264, Mar. 22, 2022, WIPO, 10 pages.

*Primary Examiner* — Jason R Kurr
(74) *Attorney, Agent, or Firm* — McCoy Russell LLP

(57) ABSTRACT

The current disclosure provides systems and methods for enhancing the audio/visual experience of a participant in a hybrid or in-situ meeting. In one example, a communications system comprises a plurality of electronic devices, each corresponding to a participant in a gathering of multiple participants, wherein one or more of the plurality of electronic devices is located in a physical meeting space, and machine executable instructions, that when executed cause the communications system to connect each of the plurality of electronic devices to a meeting platform corresponding to the physical meeting space, determine relative positions of the plurality of electronic devices, select an audio stream to transmit to the plurality of electronic devices based on sound feeds received by microphones in the plurality of electronic
(Continued)

devices, and adjust the audio stream to each of the plurality of electronic devices based on the relative positions of the plurality of electronic devices.

3 Claims, 7 Drawing Sheets

(51) Int. Cl.

| | |
|---|---|
| ***G10L 21/028*** | (2013.01) |
| ***H04R 3/12*** | (2006.01) |
| ***H04R 5/02*** | (2006.01) |
| ***H04R 5/027*** | (2006.01) |
| ***H04S 3/00*** | (2006.01) |
| *H04L 65/403* | (2022.01) |

(52) U.S. Cl.
CPC ............... *H04R 5/02* (2013.01); *H04R 5/027* (2013.01); *H04S 3/008* (2013.01); *H04L 65/403* (2013.01); *H04S 2400/01* (2013.01); *H04S 2400/11* (2013.01); *H04S 2400/13* (2013.01); *H04S 2400/15* (2013.01)

(58) Field of Classification Search
CPC ....... H04R 5/027; G06F 3/165; G10L 21/028; H04N 7/15; H04M 3/568
See application file for complete search history.

(56) References Cited

U.S. PATENT DOCUMENTS

| | | | | |
|---|---|---|---|---|
| 2013/0016842 | A1 | 1/2013 | Schultz-Amling et al. | |
| 2016/0014373 | A1* | 1/2016 | LaFata | H04M 9/082 348/14.08 |
| 2017/0353811 | A1* | 12/2017 | Mcgibney | H04H 60/04 |
| 2020/0099792 | A1* | 3/2020 | Nguyen | H04W 4/08 |

FOREIGN PATENT DOCUMENTS

| | | | |
|---|---|---|---|
| KR | 20200083685 | A | 7/2020 |
| WO | 2019124742 | A1 | 6/2019 |

* cited by examiner 500
520a
502a
504a
506a
520b
502b
504b
508b
506b
520c
502c
504c
508c
506c
510
512
514L
514R 600
620a
602a
604a
606a
620b
602b
604b
608b
606b
620c
602c
604c
608c
606c
610
612
614L
614R

FIG. 7

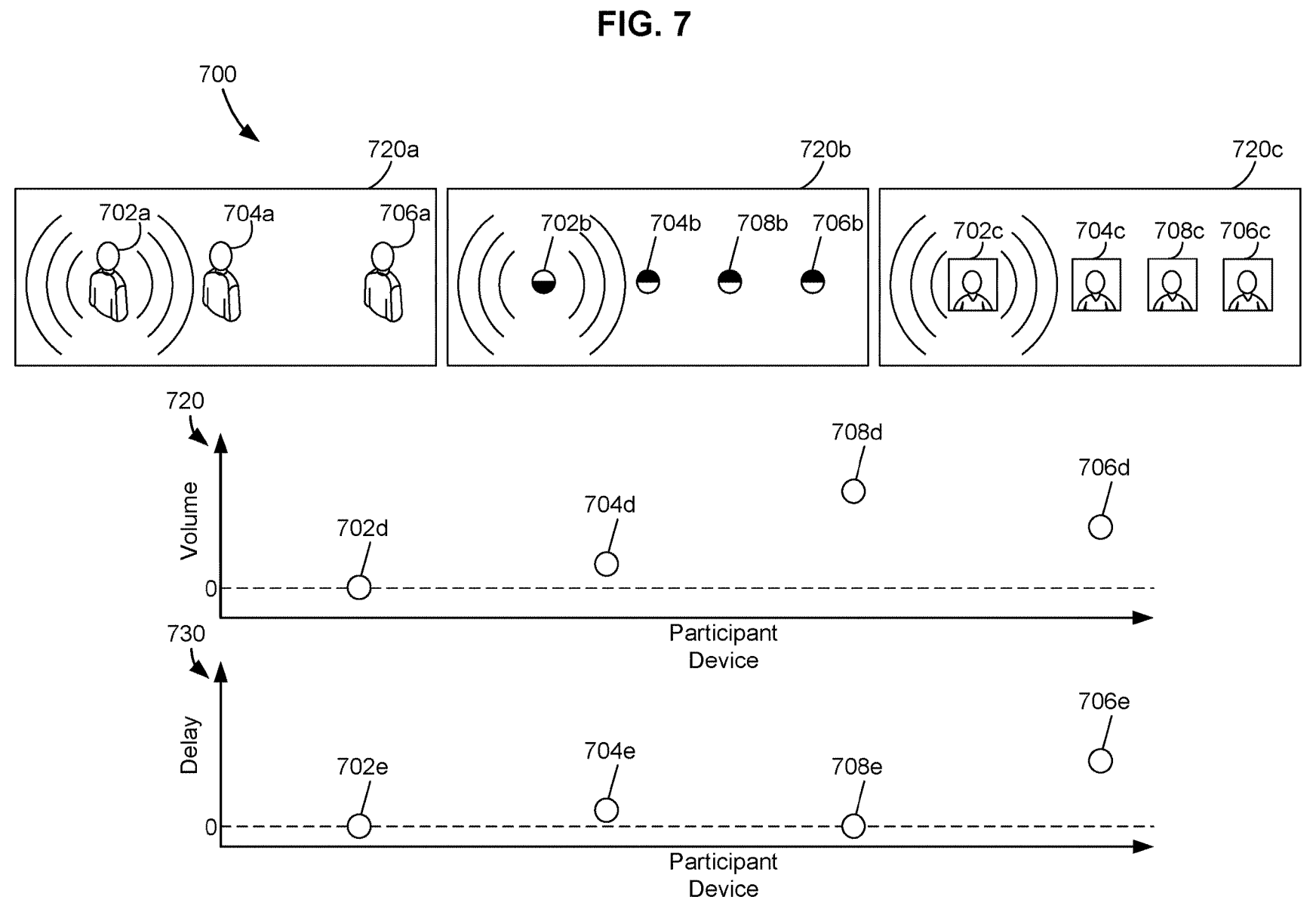

700
720a
702a
704a
706a
720b
702b
704b
708b
706b
720c
702c
704c
708c
706c
720
Volume
0
Participant Device
702d
704d
708d
706d
730
Delay
0
Participant Device
702e
704e
708e
706e

SYSTEMS AND METHODS FOR SOUND-ENHANCED MEETING PLATFORMS

CROSS REFERENCE TO RELATED APPLICATION

The present application is a U.S. National Phase of International PCT Application number PCT/US2021/061264, entitled "SYSTEMS AND METHODS FOR SOUND-ENHANCED MEETING PLATFORMS", filed on Nov. 30, 2021. Application number PCT/US2021/061264_claims priority to U.S. provisional Application No. 63/119,407, entitled "SYSTEMS AND METHODS FOR SOUND-ENHANCED MEETING PLATFORMS", filed on Nov. 30, 2020. The entire contents of the above-listed applications are hereby incorporated by reference for all purposes.

FIELD

This disclosure is directed to systems and methods for meeting platforms, and more particularly for sound-enhanced meeting platforms that may or may not include videoconferencing.

BACKGROUND

Prior videoconferencing tools (e.g., Zoom, Google Meet/Hangout, and Microsoft Teams) have seen increasingly widespread use throughout the United States and the rest of the world in 2020 due in large part to the persisting COVID-19 pandemic. Such videoconferencing tools, however, have several significant shortcomings with regard to hybrid meetings (i.e., meetings in which users meet in person but are also electronically connected with either other virtually or otherwise). In one example, remote participants (that is, participants located away from a shared physical meeting space), may feel a lack of engagement with other meeting participants, as conventional approaches fail to replicate the engaging and dynamic acoustic environment of an in-person meeting.

Further, for meeting participants located at the physical meeting space, it may be difficult to hear remote meeting participants if only one device (e.g., a laptop) is playing audio from the remote participant. In some instances, it may also be difficult for two participants at a physical meeting space to hear one another, based on the arrangement of the meeting space, as well as the hearing ability of the participants. One approach to address this issue includes retrofitting meeting spaces with audio equipment, however this approach is expensive, and is substantially limited to indoor meeting spaces wired for electricity. In another approach, participants may use mobile devices, such as laptops or cellphones to join a videoconferencing call, however when the mobile device is located within the acoustic range of the person speaking, or another mobile device (e.g., a participant device is able to directly receive sound waves from a person speaking or the electronic speakers of another mobile device), issues of reverb/echo or acoustic feedback may occur. Thus, there remains a need for improved videoconferencing systems and methods to optimize the hybrid meeting experience.

BRIEF DESCRIPTION

The inventors herein have developed systems and methods which at least partially address the above identified issues. In a first embodiment, a communications system configured to support hybrid meetings comprises a plurality of electronic devices, each corresponding to a participant in a gathering of multiple participants, wherein one or more of the plurality of electronic devices is located in a physical meeting space, and machine executable instructions, that when executed cause the communications system to connect each of the plurality of electronic devices to a meeting platform corresponding to the physical meeting space, determine relative positions of the plurality of electronic devices, select an audio stream to transmit to the plurality of electronic devices based on sound feeds received by microphones in the plurality of electronic devices, and adjust the audio stream to each of the plurality of electronic devices based on the relative positions of the plurality of electronic devices. In this way, even participants joining the meeting using a device located remotely from the physical meeting space may receive an audio stream with acoustic properties simulating those which may occur at a selected location within the physical meeting space. In this way, a more engaging meeting experience may be enabled for remotely located meeting participants. Further, for meeting participants located within the physical meeting space, a probability of irritating audio feedback, or echo/reverb produced by un-synchronized arrival times between sound originating directly from the person speaking, and sound produced by an electronic device playing an audio stream, may be reduced by adjusting playback of the audio stream of a particular electronic device based on its spatial relationship to the other electronic devices of the plurality of electronic devices.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows volume and delay adjustments which may be made to an audio stream based on relative positions of participant devices, in accordance with certain implementations of the disclosed technology.

DETAILED DESCRIPTION

Implementations of the disclosed technology are generally directed to a "Virtual Electronically Responsive Meeting Room" (also referred to herein as VERMR, pronounced "Vermeer"), which is generally designed to enhance the functionality of a typical meeting room, classroom, lecture hall, or other meeting space with at least some of the following sound and image capabilities: (1) every person in the room, no matter how large, can hear each other clearly when talking at a comfortable speech volume; (2) every person in the room can see a close-up video image of any other person in the room, either continuously in a standard "Hollywood Squares" array, or just when that person is speaking; and (3) every person in the room can share visual material (e.g., slides, images, pages, videos, or their computer screen) from their laptop, tablet, smart phone, or other suitable device such that every other person in the room can see the material. In certain embodiments, all of the above capabilities (1)-(3) may be extended to and from people who are connecting to the room virtually, e.g., by videoconference.

It will be appreciated that certain implementations may be used in large lecture halls, meeting rooms, classrooms, or other environments that may have some level of need for sound assistance (and possibly video sharing and/or other tools). Such implementations may be used even when there is no videoconference connection to that room or videoconferencing capabilities in the room.

In alternative implementations, the platform may be used in even smaller settings, such as a small discussion around a meeting table, for example. In certain situations, such as meetings for seniors who are hard of hearing, the platform may provide automatic text captioning for hard-of-hearing participants.

Figure 1:
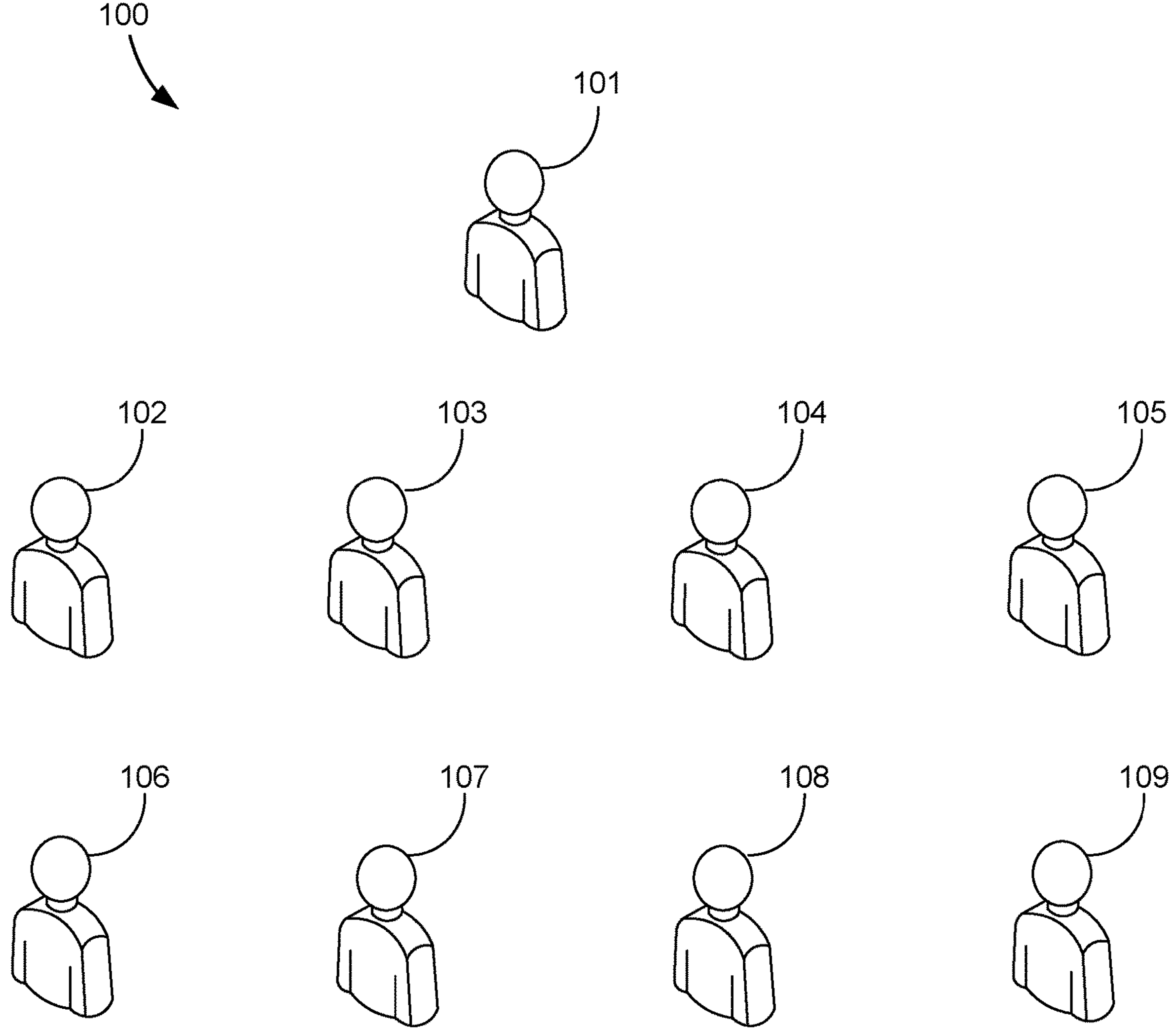
FIG. 1 is a block diagram illustrating an example of a hybrid meeting space (e.g., a classroom, lecture hall, or other meeting space) in accordance with certain implementations of the disclosed technology.

FIG. 1 is a block diagram illustrating an example of a hybrid meeting space 100 (e.g., a classroom, lecture hall, or other meeting space) in accordance with certain implementations of the disclosed technology. In the example, there is a speaker 101 (e.g., a lecturer, a teacher, or a professor) and multiple participants 102-109 (e.g., students). In certain embodiments, there may be more than one speaker or alternatively, there may be no specific speaker—in such embodiments, the meeting may include only participants (e.g., a study group).

Figure 2:
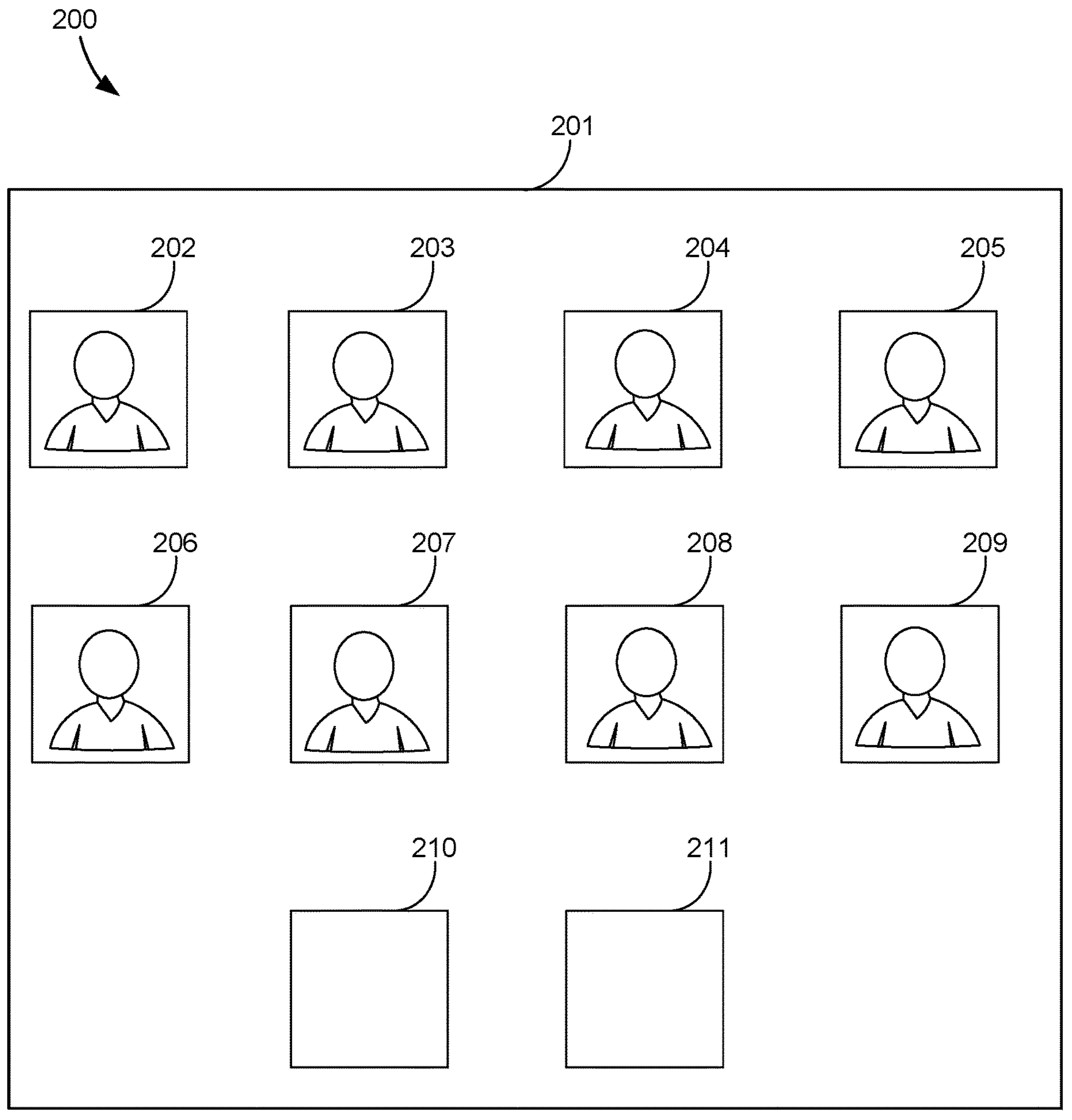
FIG. 2 is a block diagram illustrating an example of a user interface suitable for use by a speaker or participant in a hybrid meeting in accordance with certain implementations of the disclosed technology.

FIG. 2 is a block diagram illustrating an example 200 of a user interface 201 suitable for use by a speaker or participant in a hybrid meeting in accordance with certain implementations of the disclosed technology. In the example 200, the user interface 201 belongs to and is visually presented to the speaker 101 in FIG. 1 and provides a plurality of visual representations 202-209 that correspond to participants 102-109 in FIG. 1, respectively. The example 200 also includes two additional visual representations 210 and 211 that may each correspond to a certain type of content such as a document, a slide show, a photograph, a web browser window, or other suitable content.

Figure 3:
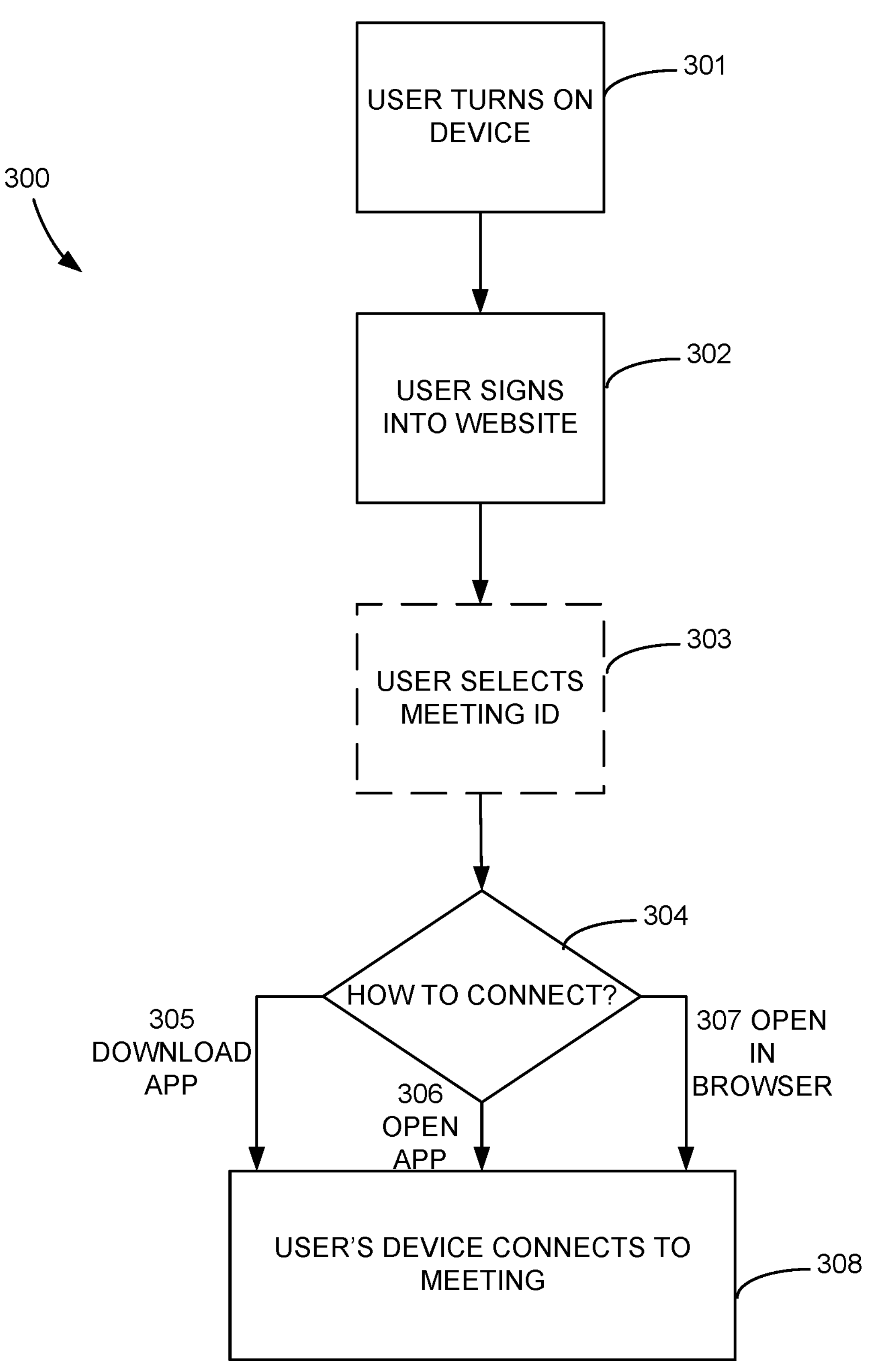
FIG. 3 is a flow diagram illustrating an example of a computer-implemented method for a user to join a hybrid meeting in accordance with certain implementations of the disclosed technology.

FIG. 3 is a flow diagram illustrating an example of a computer-implemented method 300 for a user to join a hybrid meeting in accordance with certain implementations of the disclosed technology. At 301, every person that is seated (or standing) in the room, hall, etc. turns on their own laptop computer, tablet computer, smart phone, or other suitable electronic device. At 302, each user signs on to the VERMR website using their electronic device that was turned on at 301.

At 303, each user selects their current meeting number or other ID (e.g., as shared with them by the meeting organizer, or emailed by the VERMR system if the organizer prefers that). In certain alternative implementations, the VERMR system may automatically recognize the meeting room that the participant enters or is already in. For example, the VERMR system may detect an appropriate WiFi configuration for the room. The system may also detect the relative strength of the WiFi signals from neighboring routers/repeaters. In such implementations, the system may prompt the user to enter or select the meeting ID if the system does not automatically recognize the meeting room.

At 304, the VERMR website offers the user with three different options: downloading the VERMR application/software, at 305; opening the VERMR application/software if already installed on the user's device, at 306; or simply running the VERMR software in a browser (e.g., selected by the user). The method 300 then proceeds to 308, where the user's electronic device connects to the current meeting. The method may also include the system requesting access to the user device's microphone and/or camera. The VERMR system may then show a screen (e.g., the user interface 201 of FIG. 2) with the video and sound (and, optionally, shared visual material) of all the other users that are connected to the hybrid meeting.

Figure 4:
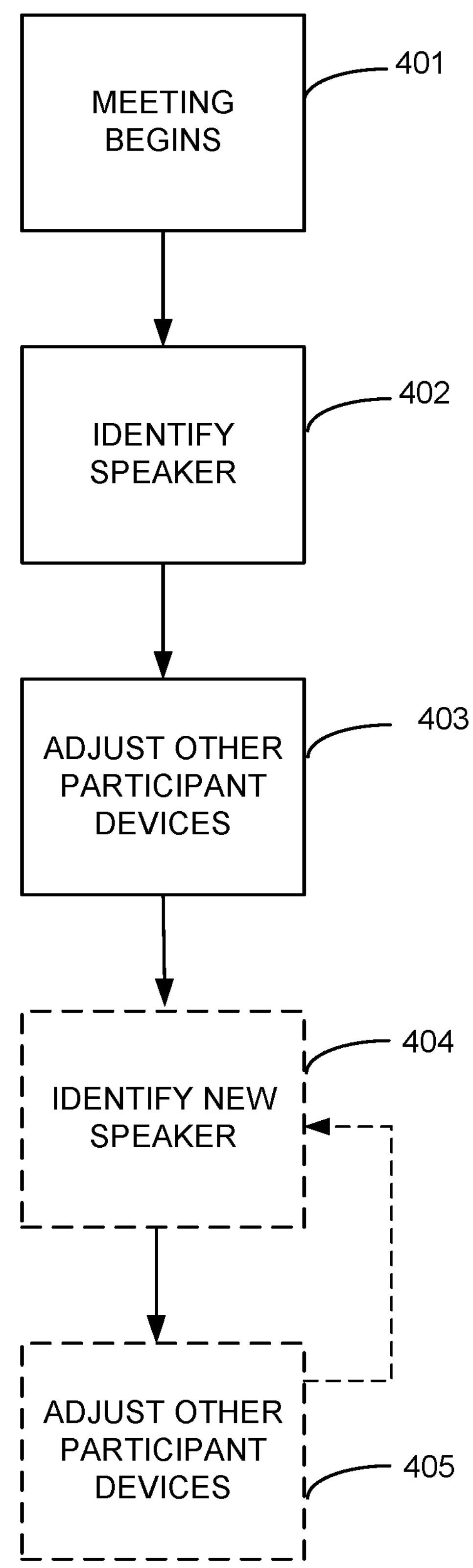
FIG. 4 is a flow diagram illustrating an example of a computer-implemented method for facilitating a hybrid meeting in accordance with certain implementations of the disclosed technology.

FIG. 4 is a flow diagram illustrating an example of a computer-implemented method 400 for facilitating a hybrid meeting in accordance with certain implementations of the disclosed technology. At 401, a hybrid meeting, class, lecture, etc. begins (e.g., as determined by when the room sound quiets sufficiently to distinguish a single voice as the dominant sound or, if necessary by the presenter or other presenter "clicking" a software button). At 402, the system may select a single person who is speaking at a time to share their sound with the rest of the room and also with any remote videoconference participants.

At 403, the system adjusts the electronic devices of the other participants accordingly. For example, within a large room the selected person's sound may be played at a quiet level through multiple connected laptop/tablet/phone speakers throughout the room. The system may dynamically set the volume at a level that is intended to slightly enhance the sound so that everyone can hear the person who is speaking, but not so loud that it is obvious that the sound is being amplified.

At 404, the system identifies a new dominant speaker (e.g., as determined by when the room sound quiets sufficiently to distinguish a new single voice as the dominant sound or, if necessary by the presenter or other presenter "clicking" a software button). At 405, the system adjusts the electronic devices of the other participants accordingly; this is similar with regard to the operation at 403 except that the dominant speaker is now a different person. As such, the original dominant speaker's device may be treated as a participant device for the duration of the new dominant speaker's talking. The steps at 404 and 405 may be repeated any number of times for any number of dominant speakers; in certain embodiments, the same person may be a dominant speaker at different times during the hybrid meeting.

In certain embodiments where participants' electronic devices (e.g., laptops, smartphones, and tablets) are connected with the VERMR system, the system may use camera images (e.g., particularly of the backgrounds seen behind the participants) and sound pickups from the participants' devices to make an estimate at a map of the space that shows relative positions of all of the participants' devices within the room. In some embodiments, differences in arrival times of natural/ambient sounds from the physical meeting space at microphones of the one or more devices may be used to generate a map of the relative positions of the one or more participant devices. In some embodiments, participant devices may generate a sound (e.g., via one or more electronic speakers of the device) which may be triangulated by one or more other participant devices in the physical meeting space, to generate the map of relative positions of the one or more participant devices. This map can be used to further improve the handling of the sound, and there may also be an option for a user correction to the map (e.g., if the algorithm(s) used by the system results in any mistakes with regard to the location or one or more of the participants' devices).

The mapping capabilities may advantageously allow the networked participants in the meeting who are not in the actual physical location (e.g., meeting room or lecture hall) to select a "place" such that they feel like they are "sitting" in the physical room—and then have their sound when they speak emanate from neighboring laptop/phone/tablet speakers. This may advantageously provide participants with the ability to have smaller-side (e.g., "whispered") discussions with "neighbors" in the room.

Implementations of the disclosed technology may include audio-analysis algorithms and highly-optimized software. The algorithms and software may gather sound feeds from all of the microphones of the laptops, tablets, smart phones, and/or other electronic devices that are connected in the hybrid meeting and analyze the relative delays and volume relationships between the many sound feeds. The algorithms and software may also analyze all feedback paths whenever the system plays any sound through one of the speakers of the laptops, tablets, smart phones, and/or other electronic devices that are connected in the hybrid meeting.

When the meeting begins, the algorithms and software may identify the primary person who is speaking from the current sound feeds, as well as any secondary person speaking (e.g., who may be trying to interrupt), and gauge when the secondary speaker should now be added to the sound mix as an overlapping sound. Using these analysis results, the algorithms and software may calculate the best choice of speakers and sound levels to play the sound feed. All of these operations may use time-delay monitoring, so that sound is not played in the room if the time delay from microphone to speaker is too long to be heard with clarity as a single fused sound, for example. In some embodiments, if a physical meeting space is sufficiently large that an arrival time at a participant device of sound waves produced by a primary or secondary person speaking is greater than a threshold arrival time, delay may be added to audio output of the participant device to synchronize the audio output of the primary and/or secondary person speaking with arrival of sound waves produced directly by the primary and/or secondary person speaking. Such embodiments may implement low-level software coding for the laptops, tablets, smart phones, and/or other electronic devices as well as analysis (and possibly prescriptions) for Wi-Fi and/or Bluetooth systems that are within the room.

The VERMR system disclosed herein may advantageously present a highly simplified interface to the users, such that they will have the experience of opening up their laptops, tablets, smart phones and/or other electronic devices, connecting to a certain identified website using a link that was distributed for the meeting, and immediately being in a sound-and-video enhanced meeting room. Alternatively or in addition thereto, the system may automatically connect participants to the intended/correct meeting upon the user's device entering the VERMR website or app (e.g., based on the system recognizing where the participant is).

Figures 5, 6:
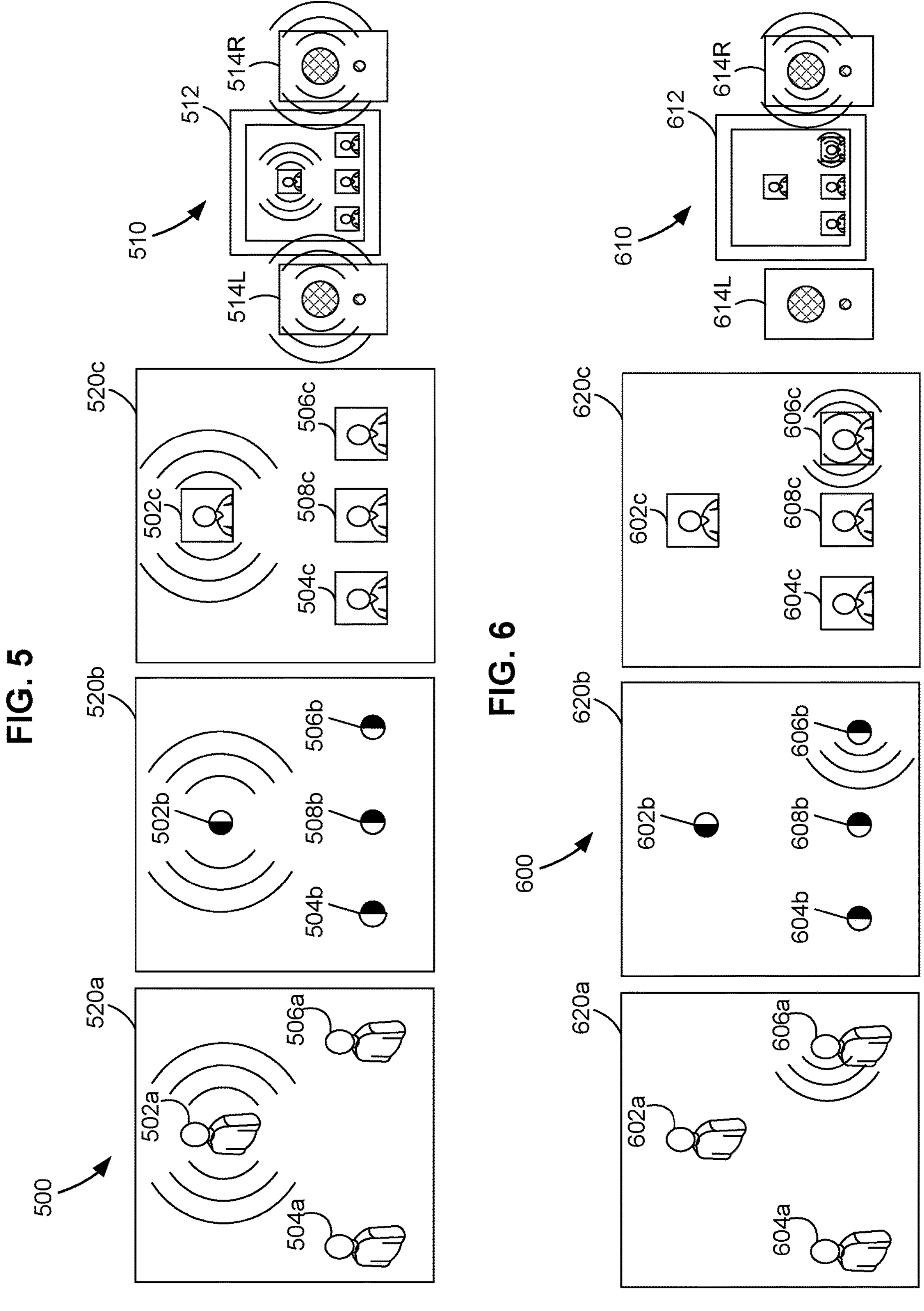
FIG. 5 shows a first point in time during a hybrid meeting from various perspectives, in accordance with certain implementations of the disclosed technology.
FIG. 6 shows a second point in time during the hybrid meeting from various perspectives, in accordance with certain implementations of the disclosed technology.

Turning to FIG. 5, an illustration of an exemplary scenario 500 is shown. Scenario 500 illustrates, from various perspectives, a point in time during a hybrid meeting conducted in accordance with one or more steps of the methods disclosed herein. Scenario 500 shows various perspectives of a hybrid meeting, to better illustrate how aspects of the current disclosure work in concert to provide enhanced sound, and a more engaging meeting experience, to both local meeting participants (participants associated with electronic devices 502*a*, 504*a*, and 506*a*, located in a physical meeting space 520*a*) and remote participants (participants associated with electronic devices located remote from the physical meeting space 520*a*, such as remote electronic device 510).

In scenario 500, propagation of a sound is illustrated as three concentric arcs centered on a source of the sound. It will be appreciated that the concentric arcs are used to facilitate understanding of scenario 500, and are not intended to represent physical, visible structures, with the exception that, in some embodiments, GUI 520*c* may include a visual display element, such as the three concentric arcs centered on first video feed 502*c*, emphasizing a source (or sources) of a current audio stream. It will be appreciated that other visual display elements may be used to indicate video streams associated with a current audio stream.

Scenario 500 illustrates a plurality of electronic devices (electronic devices 502*a*, 504*a*, and 506*a*) located in a physical meeting space 520*a*. The electronic devices located in the physical meeting space 502*a* may be referred to as locally located devices, or local devices, in the description of FIG. 5. In some embodiments, physical meeting space 520*a* may be a lecture hall, a conference room, a classroom, or other physical space where one or more electronic devices associated with one or more meeting participants, is located. In some embodiments, physical meeting space 520*a* may be a location not wired for electricity, such as a region located outside. Each of the local devices 502*a*, 504*a*, and 506*a*, is connected to a meeting platform via a wired or wireless communication network. In an exemplary embodiment, local electronic devices 502*a*, 504*a*, and 506*a* may be connected to a meeting platform via one or more of a WiFi connection, a cellular connection, and an Ethernet connection. In some embodiments, the WiFi and/or cellular connection may be correlated to the physical meeting space 520*a*, and an associated meeting ID, thereby enabling participant devices to automatically connect to a meeting platform/room corresponding to the physical meeting space 520*a*. In some embodiments, a local device may be matched to a meeting ID based on a location of the local device being within a threshold distance of a physical meeting space, wherein the location of the local device with respect to the physical meeting space may be determined based on a GPS location of the local device.

As illustrated by the three concentric rings on either side of locally located electronic device 502*a*, a meeting participant associated with/proximal to electronic device 502*a* has been identified by the meeting platform as a primary speaker. In some embodiments, a current sound feed recorded by one or more microphones of locally located device 502*a* may be set as a current audio stream, wherein the audio stream is transmitted to each electronic device connected to a current meeting.

Virtual meeting space 520*b*, which may also be referred to herein as a location map, comprises relative locations and/or orientations of electronic devices associated with both local and remote electronic devices connected to the current meeting. As shown in FIG. 5, device locations are indicated with circles, wherein a black half of each circle indicates a right side of a corresponding participant device. A location and/or orientation of a participant device in the virtual meeting space 520*b* may either be determined based on an estimated location and/or orientation of the device within the physical meeting space 520*a*, or may be selected based on user input received via a user input device.

As shown in scenario 500, the locations and orientations of local devices 502*a*, 504*a*, and 506*a*, within physical meeting space 520*a* have been estimated and mapped to a virtual meeting space 520*b*. In particular, locations and orientations of devices 502*a*, 504*a*, and 506*a* in the physical meeting space 520*a* have been estimated and mapped to locations 502*b*, 504*b*, and 506*b*, in the virtual meeting space 520*b*, respectively. In some embodiments, GPS sensors within one or more of devices 502*a*, 504*a*, and 506*a*, may be used to determine the respective locations and/or orientations of said devices within physical meeting space 520*a*, and these locations and orientations may be mapped to locations 502*b*, 504*b*, and 506*b* in location map 520*b*. In some embodiments, sound feeds recorded by one or more of a plurality of local devices may be used to determine relative locations of one or more of the plurality of local devices, and the relative positions may be used to generate location map 520*b*. In one example, sound source triangulation may be used to determine relative positions of locally located electronic devices within physical meeting space 520*a*. In particular, as there are three local devices in scenario 500, relative locations of devices 502*a*, 504*a*, and 506*a*, with respect to each other on a plane may be determined. In scenarios with two local devices, distance information between the two locally located devices may be determined by sound source triangulation, whereas if four or more devices are located in physical meeting space 520*a*, relative positions of each of the four or more devices in three-dimensional space may be determined. In some embodiments, an orientation of a device located in a physical meeting space may be determined based on a known distance between a first microphone and a second microphone of the device, and a differential in arrival time of a sound generated from a previously determined location.

In some embodiments, a video feed from a camera of the local devices may be used to determine a location and/or orientation of the local device within the physical meeting space 520*a*. In one example, the location and orientation of a local device within a physical meeting space may be determined by identifying one or more landmarks in a video feed recorded by a camera of the device, wherein landmarks may comprise QR codes, walls, doorways, or other features of the physical meeting space.

Virtual meeting space 520*b* further includes location 508*b*, which may also be referred to herein as a proxy location, as location 508*b* serves as a proxy of the location a remote meeting participant may have occupied if physically present. Proxy location 508*b* corresponds to a remote electronic device 510. Meeting participants located remotely from a physical meeting space may connect a remote electronic device to the meeting platform, and join a current meeting associated with a physical meeting space. Once connected, a remote participant may provide a selection of a proxy location and orientation within the physical meeting space using a user input device. The selected location and orientation may then be mapped to a virtual space, such as virtual space 520*b*, establishing a simulated spatial relationship between the remote device and the local devices (as well as other remote devices which have selected proxy locations). In some embodiments, a graphical representation of relative positions of local devices (and remote devices which have selected corresponding proxy locations), such as location map 520*b*, may be displayed via a remote device, such as via display device 512 of remote device 510, to a remote participant, enabling the remote participant to select a proxy location based on current locations of meeting attendees.

Scenario 500 further illustrates an exemplary GUI 520*c*, showing video feeds 502*c*, 504*c*, 506*c*, and 508*c*, recorded via electronic devices 502*a*, 504*a*, 506*a*, and 510, respectively. As can be seen, the relative positions of video feeds 502*c*, 504*c*, 506*c*, and 508*c* within GUI 520*c* correspond to the spatial relationships between locations 502*b*, 504*b*, 506*b*, and 508*b*, in the virtual meeting space 520*b*, respectively. GUI 520*c* may be displayed by one or more participant devices. In particular, scenario 500 shows GUI 520*c* displayed via a display device 512 of remote device 510. In some embodiments, a video feed associated with a primary and/or secondary person speaking may be visually emphasized, thereby drawing participant attention to the video feed of one or more current participants speaking. As shown in GUI 520*c*, a visual display element comprising a plurality of concentric arcs are centered on video feed 502*c*, as the current person speaking is associated with device 502*a*.

In scenario 500, location 502*b* in virtual meeting space 520*b* has been identified as a source location for a current audio stream being transmitted to each participant device (devices 502*a*, 504*a*, 506*a*, and 510). In some embodiments, a source location of a primary person speaking may be set as a location of a device closest to the primary person speaking, such as is shown in scenario 500. In some embodiments, a source location of a primary person speaking may be determined using sound source triangulation of the person speaking using microphones of one or more participant devices. Playback of the current audio stream at a participant device, such as remote device 510, may be adjusted based on a spatial relationship between the source location of the audio stream (e.g., location 502*b*) and a location of the participant device (e.g., proxy location 508*b*). In some embodiments, acoustic simulation of the relative position between a first and a second meeting participant may be produced by recording a sound feed of the first participant via one or more microphones of a first participant device, and adjusting a volume, delay, or other acoustic settings of one or more speakers of a second participant device associated with the second meeting participant, based on the relative position and orientation of the first device with respect to the second device. As shown by scenario 500, as proxy location 508*b* is positioned proximal to, and facing location 502*b*, and as location 502*b* has been identified as the source location for the current audio stream, left speaker 514L and right speaker 514R of remote device 510 output the audio stream with a same volume and delay.

Turning to FIG. 6, an illustration of an exemplary scenario 600 is shown. Scenario 600 illustrates, from various perspectives, a point in time during a hybrid meeting conducted in accordance with one or more steps of the methods disclosed herein. Scenario 600 shows various perspectives of a hybrid meeting, to better illustrate how aspects of the current disclosure work in concert to provide enhanced sound, and a more engaging meeting experience, to both local meeting participants (participants associated with electronic devices 602*a*, 604*a*, and 606*a*, located in a physical meeting space 620*a*) and remote participants (participants associated with electronic devices located remote from the physical meeting space 620*a*, such as remote electronic device 610).

In scenario 600, propagation of a sound is illustrated as three concentric arcs centered on a source of the sound. It will be appreciated that the concentric arcs are used to facilitate understanding of scenario 600, and are not intended to represent physical, visible structures, with the exception that, in some embodiments, GUI 620*c* may include a visual display element, such as the three concentric arcs centered on video feed 606*c*, emphasizing a source (or sources) of a current audio stream.

Scenario 600 illustrates a plurality of electronic devices (electronic devices 602*a*, 604*a*, and 606*a*) located in a physical meeting space 620*a*. The electronic devices located in the physical meeting space 602*a* may be referred to as locally located devices, or local devices, in the description of FIG. 6. In some embodiments, physical meeting space 620*a* may be a lecture hall, a conference room, a classroom, or other physical space where one or more electronic devices associated with one or more meeting participants, is located. In some embodiments, physical meeting space 620*a* may be a location not wired for electricity, such as a region located outside. Each of the local devices 602*a*, 604*a*, and 606*a*, is connected to a meeting platform via a wired or wireless communication network. In an exemplary embodiment, local electronic devices 602*a*, 604*a*, and 606*a* may be connected to a meeting platform via one or more of a WiFi connection, a cellular connection, and an Ethernet connection. In some embodiments, the WiFi and/or cellular connection may be correlated to the physical meeting space 620*a*, and an associated meeting ID, thereby enabling participant devices present in physical meeting space 620*a* to automatically connect to a meeting platform/room corresponding to the physical meeting space 620*a*. In some embodiments, a local device may be matched to a meeting ID based on a location of the local device being within a threshold distance of a physical meeting space, wherein the location of the local device with respect to the physical meeting space may be determined based on a GPS location of the local device.

As illustrated by the three concentric arcs to the left of, and centered on, electronic device 606*a*, a meeting participant associated with/proximal to electronic device 606*a* has been identified by the meeting platform as a primary speaker. In some embodiments, a current sound feed recorded by one or more microphones of locally located device 606*a* may be set as a current audio stream, wherein the audio stream is transmitted to each electronic device connected to a current meeting.

Virtual meeting space 620*b*, which may also be referred to herein as a location map, comprises relative locations and/or orientations of electronic devices associated with both local and remote electronic devices connected to the current meeting. As shown in FIG. 6, device locations are indicated with circles, wherein a black half of each circle indicates a right side of a corresponding participant device. A location and/or orientation of a participant device in the virtual meeting space 620*b* may either be determined based on an estimated location and/or orientation of the device within the physical meeting space 620*a*, or may be selected based on user input received via a user input device.

As shown in scenario 600, the locations and orientations of local devices 602*a*, 604*a*, and 606*a*, within physical meeting space 620*a* have been estimated and mapped to a virtual meeting space 620*b*. In particular, locations and orientations of devices 602*a*, 604*a*, and 606*a* in the physical meeting space 620*a* have been estimated and mapped to locations 602*b*, 604*b*, and 606*b*, in the virtual meeting space 620*b*, respectively. In some embodiments, GPS sensors within one or more of devices 602*a*, 604*a*, and 606*a*, may be used to determine the respective locations and/or orientations of said devices within physical meeting space 620*a*, and these locations and orientations may be mapped to locations 602*b*, 604*b*, and 606*b* in location map 620*b*. In some embodiments, sound feeds recorded by one or more of a plurality of local devices may be used to determine relative locations of one or more of the plurality of local devices, and the relative positions may be used to generate location map 620*b*. In one example, sound source triangulation may be used to determine relative positions of locally located electronic devices within physical meeting space 620*a*. In particular, as there are three local devices in scenario 600, relative locations of devices 602*a*, 604*a*, and 606*a*, with respect to each other on a plane may be determined. In some embodiments, an orientation of a device located in a physical meeting space may be determined based on a known distance between a first microphone and a second microphone of the device, and a differential in arrival time of a sound generated from a previously determined location.

In some embodiments, a video feed from a camera of the local devices may be used to determine a location and/or orientation of the local device within the physical meeting space 620*a*. In one example, the location and orientation of a local device within a physical meeting space may be determined by identifying one or more landmarks in a video feed recorded by a camera of the device, wherein landmarks may comprise QR codes, walls, doorways, or other features of the physical meeting space.

Virtual meeting space 620*b* further includes location 608*b*, which may also be referred to herein as a proxy location, as location 608*b* serves as a proxy of the location a remote meeting participant may have occupied if physically present. Proxy location 608*b* corresponds to a remote electronic device 610. Meeting participants located remotely from a physical meeting space may connect a remote electronic device to the meeting platform, and join a current meeting associated with a physical meeting space. Once connected, a remote participant may provide a selection of a proxy location and orientation within the physical meeting space using a user input device. The selected location and orientation may then be mapped to a virtual space, such as virtual space 620*b*, establishing a simulated spatial relationship between the remote device and the local devices (as well as other remote devices which have selected proxy locations). In some embodiments, a graphical representation of relative positions of local devices (and remote devices which have selected corresponding proxy locations), such as location map 620*b*, may be displayed via a remote device, such as via display device 612 of remote device 610, to a remote participant, enabling the remote participant to select a proxy location based on current locations of meeting attendees.

Scenario 600 further illustrates an exemplary GUI 620*c*, showing video feeds 602*c*, 604*c*, 606*c*, and 608*c*, recorded via electronic devices 602*a*, 604*a*, 606*a*, and 610, respectively. As can be seen, the relative positions of video feeds 602*c*, 604*c*, 606*c*, and 608*c* within GUI 620*c* correspond to the spatial relationships between locations 602*b*, 604*b*,

606*b*, and 608*b*, in the virtual meeting space 620*b*, respectively. GUI 620*c* may be displayed by one or more participant devices. In particular, scenario 600 shows GUI 620*c* displayed via a display device 612 of remote device 610. As shown in GUI 620*c*, a visual display element comprising a plurality of concentric arcs are centered on video feed 606*c*, visually emphasizing that a current "dominant speaker" or primary person speaking is associated with device 606*a*.

In scenario 600, location 606*b* in virtual meeting space 620*b* has been identified as a source location for a current audio stream being transmitted to each participant device (devices 602*a*, 604*a*, 606*a*, and 610). Playback of the current audio stream at a participant device, such as remote device 610, may be adjusted based on spatial relationships between the source location of the audio stream (e.g., location 606*b*) and a location of the participant device (e.g., proxy location 608*b*). In some embodiments, acoustic simulation of the relative position between a first and a second meeting participant may be produced by recording a sound feed of the first participant via one or more microphones of a first participant device, and adjusting a volume, delay, or other acoustic settings of one or more speakers of a second participant device associated with the second meeting participant, based on the relative position and orientation of the first device with respect to the second device. As shown by scenario 600, as the source location 606*b* is located to the right side of proxy location 608*b* (that is, closer to the black half of location 608*b*), a volume output of right speaker 614R of remote device 610 may be greater than a volume output of left speaker 614L, thereby simulating for a remote participant associated with remote device 610 an acoustic environment approximating what the participant would experience if located in physical meeting space 620*a*, at the selected proxy location/orientation 606*b*.

Turning to FIG. 7, an illustration of an exemplary scenario 700 is shown. Scenario 700 illustrates adjustments which may be made to a volume and playback delay of an audio stream transmitted to a plurality of participant devices, based on a spatial relationship between an estimated source location 702*b* of the current audio stream, and the respective locations of the plurality of participant devices 702*b*, 704*b*, 706*b*, and 708*b*. In scenario 700, three participant devices 702*a*, 704*a*, and 706*a* are located in a physical meeting space 720*a*, with one remote device (not shown) located outside of the physical meeting but connected to a same unique meeting as the local devices 702*a*, 704*a*, and 706*a*.

The positions of local devices 702*a*, 704*a*, and 706*a* within physical meeting space 720*a* have been mapped to corresponding locations 702*b*, 704*b*, and 706*b* in virtual meeting space 720*b*, while proxy location 708*b* corresponds to a location in virtual meeting space 720*b* selected for the remote device. Left/right orientation of each participant device in the virtual meeting space 720*b* is indicated by a half black circle at each respective device location, wherein a black half of a circle indicates a right side of a corresponding participant device at the associated location. It will be appreciated that FIG. 7 shows left/right orientations of each location in virtual meeting space 720*b* for simplicity, and that the current disclosure provides for left/right, front/back, and/or up/down orientations to be determined for one or more participant devices.

GUI 720*c* shows video feeds 702*c*, 704*c*, 706*c*, and 708*c*, which were recorded by cameras of devices 702*a*, 704*a*, 706*a*, and the remote device, respectively. The location of video feeds 702*c*, 704*c*, 706*c*, and 708*c* within GUI 720*c* are based on the relative spatial relationships between locations 702*b*, 704*b*, 706*b*, and 708*b* within virtual meeting space 720*b*, respectively. In other words, GUI 720*c* is tiled with video feeds from respective participant devices, based on either estimated spatial relationships between participant devices (for devices located in the physical meeting space) or spatial relationships inferred based on a user selected location and orientation within a virtual meeting space (for remote devices).

In scenario 700, a source location of sound is illustrated as three concentric arcs centered on the source of the sound. It will be appreciated that the concentric arcs are used to facilitate understanding of scenario 700, and are not intended to represent physical or visible structures, with the exception that, in some embodiments, GUI 720*c* may include a visual display element, such as the three concentric arcs centered on first video feed 702*c*, emphasizing a source (or sources) of a current audio stream.

In scenario 700, location 702*b* in virtual meeting space 720*b* has been identified as a source location for a current audio stream being transmitted to each participant device (devices 702*a*, 704*a*, 706*a*, and the remote device). Playback of the current audio stream at each participant device may be adjusted based on a spatial relationship between the source location of the audio stream (e.g., location 702*b*) and a location of the particular participant device (e.g., proxy location 708*b*). In particular, volume (shown by chart 720) and a playback delay (shown by chart 730) may be independently set for each participant device based on a spatial relationship between the source location(s) of a current audio stream and a location of each participant device.

Chart 720 shows volume settings 702*d*, 704*d*, 706*d*, and 708*d* applied to devices 702*a*, 704*a*, 706*a*, and the remote device, respectively. While chart 730 shows playback delay settings 702*e*, 704*e*, 706*e*, and 708*e*, applied to devices 702*a*, 704*a*, 706*a*, and the remote device, respectively.

For device 702*a*, which has been identified as a current source location for the audio stream, volume 702*d* is set to zero. This is because sound produced by a current person speaking arrives at location 702*b* very rapidly (as this is the position of the current person speaking in scenario 700), and therefore to prevent an echo effect which may occur due to a difference in time between when a sound reaches location 702*b* directly from the person speaking, and from playback of the audio stream by device 702*a*, a volume of the audio stream may be set to zero for device 702*a*. In other words, due to an intrinsic lag between when a sound is recorded at a location, and when said recorded sound could be output at the same location, even with delay 702*e* set to zero, playing the sound in this location may cause an echo effect.

For device 704*a*, which is closer to the source location of the audio stream than either the remote device, or device 706*a*, the volume is set to a low, positive value, as the amount of sound reaching location 704*b* directly from the person speaking, when combined with the sound produced by device 706*a*, is within a threshold of a volume set point for device 704*a*. Further, playback delay 704*e*, which is applied to device 704*a*, is a small, positive value. Delay 704*e* is smaller than delay 706*e*, applied to device 706*a*, as device 706*a* is further from the source location of the current audio stream. In other words, a delay applied to a participant device in a physical meeting space with the source of a current audio stream may increase in proportion to the distance from the source location, thereby enabling sound waves produced directly by the person speaking, and sound waves produced by an electronic speaker of a proximal electronic device, to reach the ears of the participant within a threshold duration of each other. Further, volume 704*d* applied to device 704*a* is lower than volume 706*d* applied to device 706*a*, as a distance between device 706*a* and the source location is greater than a distance between device 704*a* and the source location. In other words, for devices located within acoustic range of a person speaking, an applied volume setting may be a function of the distance from the current person speaking, as an amount of sound reaching a point attenuates at as the distance between the point and the source of sound increases. In some embodiments, the volume applied to a device may be proportional to the distance from the current person speaking to the device. In some embodiments, the volume applied to the device may be proportional to the square of the distance between the source of the sound and the device. In another embodiment, the volume may be set in inverse proportion to a distance, or the square of the distance, between the device and the source of the sound, thereby mimicking the natural decay of sound with distance. Further, in some embodiments a volume applied to a participant device may be based on a function which mimics the way sound in the physical meeting space propagates from the source of the sound and arrives at different locations within the physical meeting space (e.g., a location of the participant device) based on the positions of structures in the physical meeting space (e.g., the walls and ceiling).

For the remote device, a delay 708*e* may be applied independently of a distance to the source location (that is, the distance between location 702*b* and 708*b* in the virtual meeting space), as the remote device is not within an acoustic range of the current person speaking, and therefore echo/reverb induced by out of sync arrival times of direct sound waves from the speaker and sound waves produced by the remote device is unlikely. A volume 708*d* applied to the remote device may be greater than volumes applied to local devices 702*a*, 704*a*, and 706*a*, as no direct sound from the current person speaking reaches a physical location of the remote device, and therefore sound produced by the remote device does not combine with direct sound produced by the person speaking.

Figure 8:
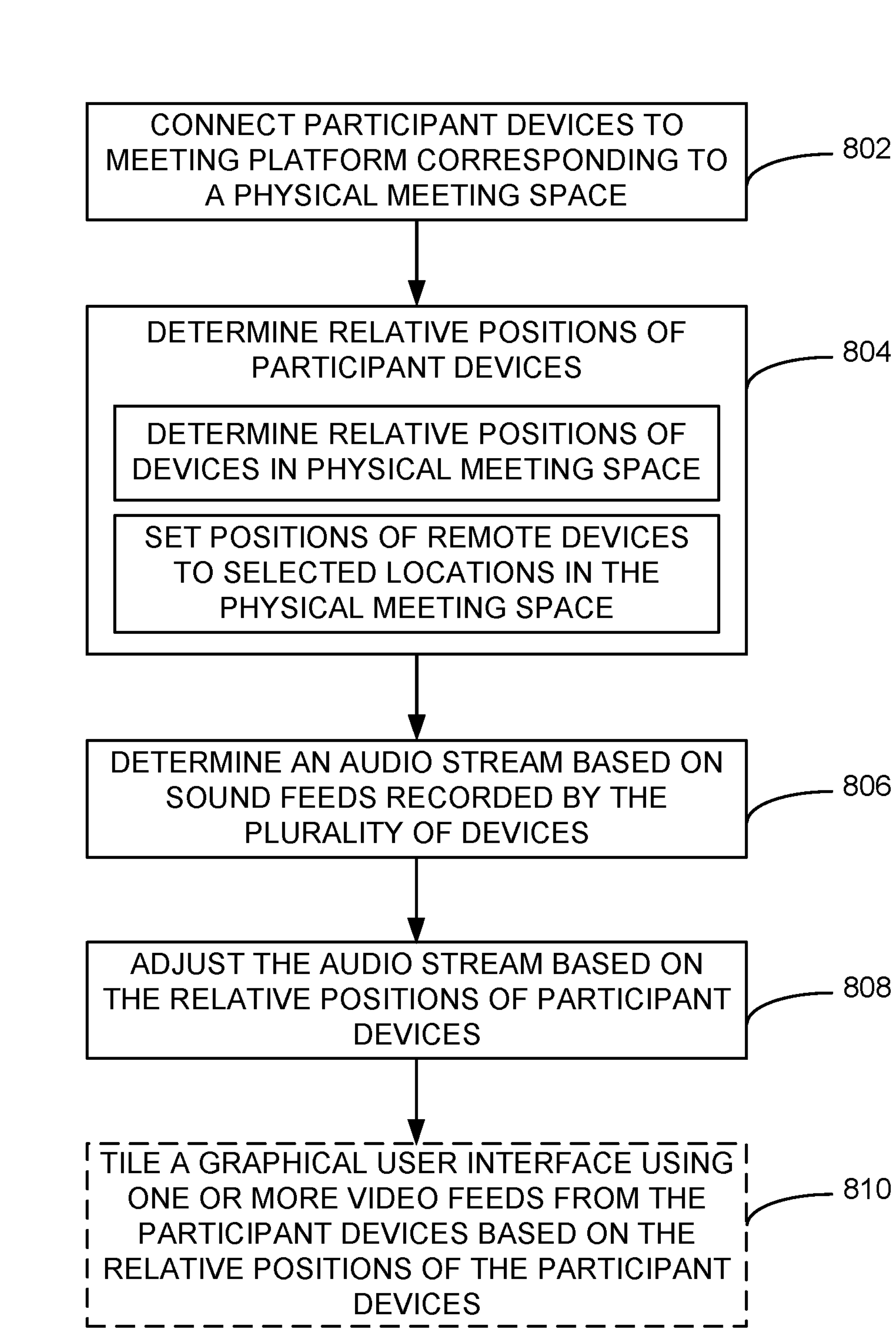
FIG. 8 is a flow diagram illustrating an exemplary method of providing enhanced sound to a hybrid meeting, in accordance with certain implementations of the disclosed technology.

Turning to FIG. 8, an exemplary method 800 for providing enhanced sound to a plurality of meeting participants associated with a plurality of electronic devices, is shown. Method 800 may be executed by a communications system comprising a plurality of electronic devices (e.g., cellphones, laptops, desktop computers, etc.) based on machine executable instructions stored locally on one or more participant devices, and/or stored remotely in a server.

At operation 802, the communication system connects participant devices to a meeting platform corresponding to a physical meeting space. In some embodiments, a meeting may be scheduled for a pre-determined time, at a pre-determined physical meeting space, and associated with a unique meeting ID. A participant device, in response to connecting to the meeting platform via a connection channel associated with the pre-determined meeting place, at, or within a threshold duration of the pre-determined meeting time, may automatically connect to the scheduled meeting associated with the unique meeting ID. In an exemplary embodiment, each of the plurality of electronic devices is communicatively coupled to a meeting platform via one or more connection types, wherein the connection types may include but are not limited to a WiFi connection, a cellular connection, a Bluetooth connection, and an Ethernet connection. In some embodiments, the communication system may automatically connect one or more local devices of the plurality of electronic devices to the meeting platform corresponding to the physical meeting space by correlating a WiFi connection of the local devices to a meeting ID, and automatically connecting the local devices to a meeting corresponding to the meeting ID, wherein the meeting ID may comprise an alpha numeric string uniquely identifying the meeting. In some embodiments, a local device may be matched to a meeting ID based on a location of the local device being within a threshold distance of the physical meeting space, wherein the location of the local device with respect to the physical meeting space may be determined based on a GPS location of the local device.

At operation 804, the communication system determines locations and/or orientations of the plurality of participant devices by determining locations/orientations of one or more local devices of the plurality of devices located within the physical meeting space, and setting proxy locations/orientations of remote devices not located within the physical meeting space.

In some embodiments, the communication system determines relative positions of the one or more electronic devices in the physical meeting space based on one or more of sound feeds and video feeds received by the one or more electronic devices, and maps the determined relative positions to a virtual meeting space corresponding to the physical meeting space. In some embodiments, GPS sensors within one or more of the local devices may be used to determine the respective locations and/or orientations of said devices within the physical meeting space. In some embodiments, sound feeds recorded by one or more of the local devices may be used to determine relative locations/orientations of one or more of the local devices, which may then be mapped to the virtual meeting space. In some embodiments, sound source triangulation may be used to determine relative positions of the local devices within the physical meeting space. In some embodiments, an orientation of a first device located in a physical meeting space with respect to a second device located within the physical meeting space, may be determined based on a known distance between a first microphone and a second microphone of the first device, and a differential in arrival time of a sound generated by the second device.

In some embodiments, at operation 804 the communications system may determine a location and/or orientation of a local device within the physical meeting space based on a video feed from a camera of the local device. In one example, the location and orientation of a local device within the physical meeting space may be determined by identifying one or more landmarks in a video feed recorded by a camera of the device, wherein landmarks may comprise QR codes, walls, doorways, or other features of the physical meeting space.

In some embodiments, at operation 804, the communication system sets a position of a remote electronic device of the plurality of electronic devices to a selected location in the physical meeting space, wherein the remote device is not located in the physical meeting space. In some embodiments, the communication system may receive a selection of a proxy location and orientation within the physical meeting space from a remote meeting participant via a user input device. The communication system may then map the selected location and orientation to the virtual meeting space, establishing a simulated spatial relationship between the remote device and the local devices (as well as other remote devices which have selected proxy locations). In some embodiments, if no user selection is received at operation 804, the communication system may set a location of the remote device to a default location in the physical meeting space. In some embodiments, the default location may be based on one or more previously determined locations of the plurality of participant devices. In some embodiments, the default location may be set to a location in the physical meeting space previously selected by the participant device. It will be appreciated that the above description is provided with respect to one remote device for simplicity, and that the current disclosure provides for multiple remote devices, wherein each remote device may separately select proxy locations in the physical meeting space.

In some embodiments, at operation 804, any one or more, or a combination, of the above described approaches for determining relative positions of local and remote participant devices may be employed.

At operation 806, the communication system determines an audio stream based on sound feeds recorded by the plurality of devices. In some embodiments, in response to a time averaged volume recorded by a microphone of a device of the plurality of devices exceeding a volume threshold, the sound feed recorded by the microphone may be set as the audio stream. In some embodiments, one or more people speaking (e.g., a primary person speaking and optionally a secondary or even a tertiary person speaking) may be identified by processing the sound feeds recorded by the plurality of devices using one or more voice isolation algorithms known in the art of acoustics, such as deep neural network based algorithms (encoder-decoder models, convolutional neural networks, etc.), and cochlea emulation. In some embodiments, algorithmic-sound-cancelling techniques (which may in some embodiments comprise machine learning based sound-cancelling techniques) may be applied to a sound feed being used to produce the audio stream, to avoid feedback that may occur if a microphone of a device associated with a primary and/or secondary person speaking records output of the audio stream from the device (or a neighboring device).

At operation 808, the communication system adjusts the audio stream based on the relative positions of participant devices. In some embodiments, the communication system adjusts the audio stream to each of the plurality of electronic devices by independently setting a volume and delay for each speaker of the plurality of electronic devices based on locations and orientations of each speaker with respect to a source location of the current audio stream. In some embodiments, a delay of output of an audio stream from speakers of an electronic device is set based on an estimated distance between the electronic device and the source location of the audio stream within the virtual meeting space, such that output from the speakers of the electronic device occurs within a threshold duration of arrival of sound waves produced directly by the primary person speaking. In one example, delay for a speaker of an electronic device may be determined by dividing a distance between a primary person speaking and the electronic device by the estimated speed of sound in the physical meeting space. In this way, a participant located in the physical meeting space with the primary person speaking may experience sounds produced directly by the person speaking and sounds produced by speakers of an associated electronic device, as a continuous waveform, with reduced echo/reverb. In some embodiments, for an electronic device within acoustic range of the primary person speaking, a volume of one or more speakers of an electronic device may be set, based on a volume set point, and further based on a distance between the primary person speaking and the electronic device, such that the cumulative volume of sounds produced directly by the person speaking, and sounds produced by speakers of the electronic device, are within a threshold of the volume set point at a location of the electronic device. In some embodiments, a delay and/or volume of output of an audio stream from speakers of an electronic device is set based on output of a trained deep neural network, bypassing explicit calculation based on the speed of sound.

At operation 810, method 800 optionally includes the communication system tiling a graphical user interface (GUI) using one or more video feeds from the participant devices based on the relative positions of the participant devices in the virtual meeting space. In one example, the relative positions of video feeds displayed in a GUI may correspond to the spatial relationships between locations of the plurality of electronic devices in the virtual meeting space. Following operation 810, method 800 may end.

In this way, method 800 enables even participants joining the meeting using a device located remotely from the physical meeting space to receive an audio stream with acoustic properties simulating those which may occur at a selected location within the physical meeting space, thereby providing a more engaging meeting experience to remotely located meeting participants. Further, for meeting participants located within the physical meeting space, a probability of irritating audio feedback, or echo/reverb produced by un-synchronized arrival times between sound propagating directly from the person speaking, and sound produced by an electronic device playing an audio stream, may be reduced by adjusting playback of the audio stream of a particular electronic device based on its spatial relationship to the other electronic devices of the plurality of electronic devices.

The disclosure also provides support for a communications system, comprising: a plurality of electronic devices, each corresponding to a participant in a gathering of multiple participants, wherein one or more of the plurality of electronic devices is located in a physical meeting space, and machine executable instructions, that when executed cause the communications system to: connect each of the plurality of electronic devices to a meeting platform corresponding to the physical meeting space, determine relative positions of the plurality of electronic devices, select an audio stream to transmit to the plurality of electronic devices based on sound feeds received by microphones in the plurality of electronic devices, and adjust the audio stream to each of the plurality of electronic devices based on the relative positions of the plurality of electronic devices. In a first example of the system, the communications system adjusts the audio stream to each of the plurality of electronic devices by independently setting a volume and delay for each speaker of the plurality of electronic devices. In a second example of the system, optionally including the first example, the communications system determines the relative positions of the plurality of electronic devices by: determining relative positions of one or more electronic devices in the physical meeting space based on one or more of sound feeds and video feeds received by the one or more electronic devices, and setting the relative positions of the one or more electronic devices based on the relative positions of the one or more electronic devices in the physical meeting space. In a third example of the system, optionally including one or both of the first and second examples, the communications system determines the relative positions of the plurality of electronic devices by: setting a position of a remote device of the plurality of electronic devices to a selected location in the physical meeting space, wherein the remote device is not located in the physical meeting space. In a fourth example of the system, optionally including one or more or each of the first through third examples, the communications system selects the audio stream to transmit to the plurality of electronic devices by: isolating a first sound feed corresponding to a primary person speaking, and setting the first sound feed as the audio stream. In a fifth example of the system, optionally including one or more or each of the first through fourth examples, the communications system further selects the audio stream to transmit to the plurality of electronic devices by: isolating a second sound feed corresponding to a secondary person speaking, adding the second sound feed to the first sound feed to produce a mixed sound feed, and setting the mixed sound feed as the audio stream.

The disclosure also provides support for a method for enhancing sound in a meeting, the method comprising: connecting a plurality of electronic devices to a meeting platform, wherein the plurality of electronic devices are located in a physical meeting space, gathering a plurality of sound feeds from microphones of the plurality of electronic devices, identifying a primary person speaking based on the plurality of sound feeds, and transmitting in real time an audio stream of the primary person speaking to the plurality of electronic devices. In a first example of the method the method further comprising: for an electronic device of the plurality of electronic devices: adjusting a delay of the audio stream output by the electronic device based on a sound feed recorded by a microphone of the electronic device. In a second example of the method, optionally including the first example, the delay is adjusted based on a difference between an arrival time of audio produced directly by the primary speaker, and an arrival time of the audio stream output by the electronic device. In a third example of the method, optionally including one or both of the first and second examples the method further comprising: for an electronic device of the plurality of electronic devices: adjusting a volume of the audio stream output by the electronic device based on a sound feed recorded by a microphone of the electronic device. In a fourth example of the method, optionally including one or more or each of the first through third examples, the volume is adjusted based on a difference between a volume threshold of the device and a volume measured by the microphone of the device. In a fifth example of the method, optionally including one or more or each of the first through fourth examples the method further comprising: for an electronic device of the plurality of electronic devices: adjusting a delay of the audio stream output by the electronic device based on a distance between the device and the primary person speaking. In a sixth example of the method, optionally including one or more or each of the first through fifth examples the method further comprising: for an electronic device of the plurality of electronic devices: adjusting a volume of the audio stream output by the electronic device based on a distance between the electronic device and the primary person speaking. In a seventh example of the method, optionally including one or more or each of the first through sixth examples, transmitting in real time the audio stream of the primary person speaking to the plurality of electronic devices comprises: determining an electronic device of the plurality of electronic devices closest to the primary person speaking, and setting the audio stream to a sound feed recorded by one or more microphones of the electronic device closest to the primary person speaking. In an eighth example of the method, optionally including one or more or each of the first through seventh examples, connecting the plurality of electronic devices to the meeting platform comprises: correlating a connection, which in some embodiment may be a WiFi connection, of one or more of the plurality of electronic devices to a meeting ID, and automatically connecting the plurality of electronic devices to the meeting platform using the meeting ID.

The disclosure also provides support for a method for a hybrid meeting, the method comprising: connecting a plurality of electronic devices to a meeting platform, wherein a first electronic device of the plurality of electronic devices is located in a physical meeting space, and wherein a second electronic device of the plurality of electronic devices is remote from the physical meeting space, determining a first location of the first electronic device within the physical meeting space, setting a second location of the second electronic device in the physical meeting space based on a user selection of the second location, recording a sound feed from one or more microphones of the first electronic device, determining an audio stream based on the sound feed, transmitting the audio stream to the second electronic device, and adjusting playback of the audio stream at the second electronic device based on a relative position of the first location with respect to the second location. In a first example of the method, adjusting playback of the audio stream at the second electronic device based on the relative position of the first location with respect to the second location comprises: simulating sound propagation from the first location to the second location using two or more speakers of the second electronic device. In a second example of the method, optionally including the first example the method further comprising: recording a sound feed from one or more microphones of the second electronic device, determining an audio stream based on the sound feed, transmitting the audio stream to the first electronic device, and adjusting playback of the audio stream at the second electronic device based on the relative position of the first location with respect to the second location. In a third example of the method, optionally including one or both of the first and second examples, adjusting playback of the audio stream at the second electronic device based on the relative position of the first location with respect to the second location comprises: simulating sound propagation from the second location to the first location using two or more speakers of the first electronic device. In a fourth example of the method, optionally including one or more or each of the first through third examples the method further comprising: updating the first location to a third location based on input received by a user input device of the first electronic device.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A method for enhancing sound in a meeting, the method comprising:

connecting a plurality of electronic devices to a meeting platform, wherein the plurality of electronic devices are located in a physical meeting space;

gathering a plurality of sound feeds from microphones of the plurality of electronic devices;

identifying a primary person speaking based on the plurality of sound feeds;

transmitting in real time an audio stream of the primary person speaking to the plurality of electronic devices;

for an electronic device of the plurality of electronic devices:

adjusting a delay of the audio stream output by the electronic device based on a sound feed recorded by a microphone of the electronic device, wherein the delay is adjusted based on a difference between an arrival time of audio produced directly by the primary person speaking, and an arrival time of the audio stream output by the electronic device.

2. The method of claim 1, wherein transmitting in real time the audio stream of the primary person speaking to the plurality of electronic devices comprises:

determining an electronic device of the plurality of electronic devices closest to the primary person speaking; and setting the audio stream to a sound feed recorded by one or more microphones of the electronic device closest to the primary person speaking.

3. The method of claim 1, wherein connecting the plurality of electronic devices to the meeting platform comprises:

correlating a connection of one or more of the plurality of electronic devices to a meeting ID; and automatically connecting the plurality of electronic devices to the meeting platform using the meeting ID.

* * * * *